Jan. 21, 1936.   L. ZAIGER   2,028,640
SUCTION CUP
Filed May 27, 1935

Inventor.
Louis Zaiger
by Heard Smith & Tennant.
Attys

Patented Jan. 21, 1936

2,028,640

UNITED STATES PATENT OFFICE 2,028,640

SUCTION CUP

Louis Zaiger, Lynn, Mass.

Application May 27, 1935, Serial No. 23,617

1 Claim. (Cl. 248—206)

This invention relates to suction cups such as are used for attaching articles to panes or sheets of glass or any glazed surface. These suction cups are commonly used for attaching windshield heaters, ash cups and other articles to the windshields of automobiles and are also commonly used in stores and other places for attaching articles to show windows or show cases.

The object of the invention is to provide an improved suction cup which has exceptional holding qualities and which will retain its suction grip with the glass continuously.

In order to give an understanding of the invention I have illustrated in the drawing a selected embodiment thereof which will now be described after which the novel features will be pointed out in the appended claim.

Figure 1:
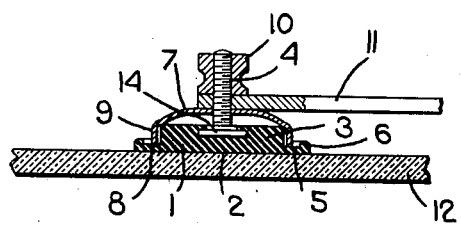
Fig. 1 is a sectional view through a suction cup embodying my invention showing it as it is when first applied to the glass but before the suction has been developed therein.
Figure 2:
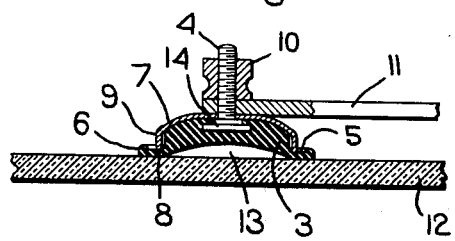
Fig. 2 is a similar view showing the suction cup having its suction grip with the glass.
Figure 3:
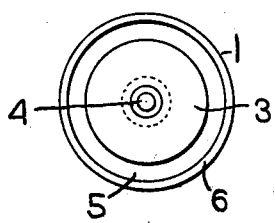
Fig. 3 is the plan view of the rubber element of the suction cup.
Figure 4:
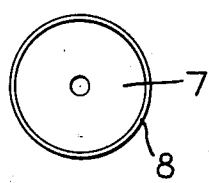
Fig. 4 is an under side view of the metal housing element.

The suction cup comprises a body element 1 of rubber which normally has a flat suction face 2. This body member 1 has the relatively thick central portion 3 in which is anchored a screw-threaded stud 4. Said body portion also has a relatively thin annular portion 5 surrounding the thick body portion 3 and the peripheral edge of the body portion is formed with the bead 6.

7 indicates a compression member designed to apply pressure to the relatively thin annular portion 5 of the body and hold the same firmly against the glass. This compression member may be made in various ways and as shown in the drawing it is in the form of a cup-shaped metal member which encloses the thicker central portion 3 of the rubber member 1 and the edge 8 of the skirt of which engages the thinner annular portion 5 of said rubber member. The stud 4 is provided with a screw-threaded nut 10. 11 indicates some portion of the article which is to be attached to the glass by means of the suction cup and preferably such portion of the article will be provided with an aperture through which the threaded stud 4 extends and will be situated between the compression member 7 and the nut 10.

In using the suction cup it is first placed against the glass 12 as shown in Fig. 1, the flat face 2 of the suction cup resting flatly against the glass. The nut 10 is then screwed up and when the nut is brought into engagement with the part 11, or with the compression member 7 if the part 11 is not present, then further turning movement of the nut 10 will draw the stem 4 upwardly and will pull the central portion of the suction face 2 away from the glass. The same force which is applied to pull the central portion of the suction face away from the glass also forces the edge 8 of the compression member firmly against the relatively thin portion 5 of the rubber body thus holding the peripheral portion of the face 2 firmly against the glass. The pulling of the central portion of the face 2 away from the glass, while the peripheral portion of said face is held firmly against the glass, produces a vacuum chamber 13 which holds the suction cup firmly and securely against the glass.

The use of the relatively thick central portion 3 is an advantage because it provides a sufficient body of rubber to securely hold the stud 4. It will be noted that the stud 4 has the head 14 which is embedded in the thicker portion 3 of the rubber body, and this result can be secured by molding the rubber about the head 14 of the stud.

When the nut is tightened to separate the central portion of the rubber body from the glass the distortion of the rubber body occurs largely at the point where the thinner annular portion 5 joins the thicker body portion because at this point the rubber is more flexible than in the thicker portion and as a result the production of the vacuum chamber 13 can be secured with the expenditure of less force than if the portion of the rubber against which the edge of the metal cap had engagement was of the same thickness as the body portion.

The presence of the bead 6 at the periphery is an advantage because it stiffens the periphery somewhat and prevents the latter from peeling up from the glass.

This application is filed as a continuation in part of my co-pending application Serial No. 729,294, filed June 6, 1934.

I claim.

A suction cup for attaching an article to a support, said suction cup comprising a rubber body member having a normally flat continuous suction face and having a relatively thick central portion, a relatively thin annular portion surrounding the central portion and a peripheral bead at the outer margin of the relatively thin portion, a threaded stud anchored in the thick portion, a cup-shaped compression member enclosing the thicker portion and having its edge bearing against the thinner portion inside of the bead, said screw-threaded stud extending through the compression member and through the article to be supported, and a nut screw threaded to said stud and adapted when tightened to draw the central thick portion into the compression member.

LOUIS ZAIGER.